H. BRETTHAUER.
TIRE PATCH CLAMP.
APPLICATION FILED AUG. 10, 1916.

1,220,819.

Patented Mar. 27, 1917.

WITNESSES

INVENTOR
H. Bretthauer
BY
ATTORNEYS

UNITED STATES PATENT OFFICE.

HERMAN BRETTHAUER, OF NEW YORK, N. Y.

TIRE-PATCH CLAMP.

1,220,819.

Specification of Letters Patent.

Patented Mar. 27, 1917.

Application filed August 10, 1916. Serial No. 114,140.

*To all whom it may concern:*

Be it known that I, HERMAN BRETTHAUER, a citizen of the United States, and a resident of the city of New York, borough of the Bronx, in the county of Bronx and State of New York, have invented a new and Improved Tire-Patch Clamp, of which the following is a full, clear, and exact description.

This invention relates to a tire patch clamp for the purpose of holding the patch and tire compressed together during the setting of the cement.

The invention has for its general objects to provide a tool of this character which is of comparatively simple construction, reliable and efficient in use, and so designed that the patch of a tire can be easily, quickly and effectively performed.

A more specific object of the invention is the provision of a tool composed of pivotally connected members having jaws urged toward each other by a spring, one of the jaws being adapted to engage and cover the patch, while the other jaw grips the opposite side of the tire, such latter jaw being provided with a disk or plate mounted for universal movement and slightly concaved so as to better accommodate itself to the tire and insure a uniform application of pressure on the patch, it being understood that the tire patches now on the market are thicker at the center than at the edges. After the tool has been once applied to the patch and tire, the spring holds the jaws closed, so that the operator's attention is not required during the setting of the cement.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a perspective view of the tool;

Figure 1:
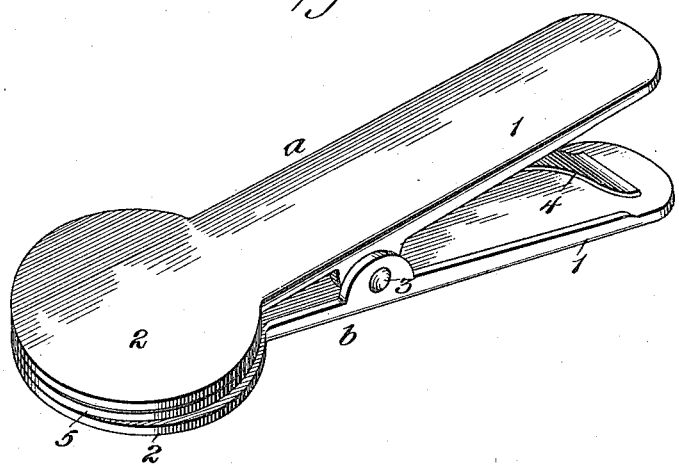
Figure 3:
Fig. 3 is a sectional view of the pressure equalizing plate of one of the jaws.
Figure 2:
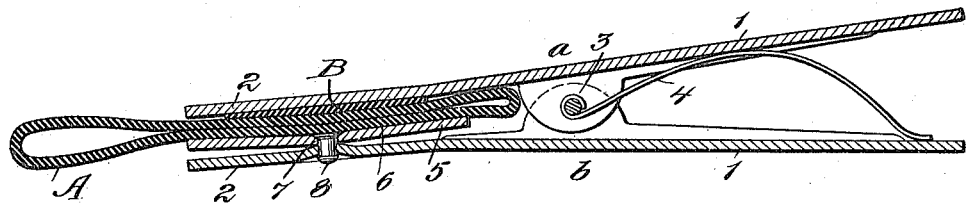
Fig. 2 is a sectional view of the tool, tire and patch.

Referring to the drawing, $a$ and $b$ designate the two sections of the tool, each section being formed with a handle member 1 and a jaw member 2, the pivot or hinge 3 being located between the handle and jaw members. A spring 4 operates between the handle members to force them apart, and consequently force the jaw members together. The jaw members are flat and circular and slightly larger than the diameter of the circular patch for a tire. To better equalize the pressure and insure a better job one of the jaw members is provided with a plate or disk 5 which has a concaved inner face 6. The center of this plate has an opening 7 for receiving the rivet 8 by which it is loosely attached to the jaw member 2 of the section $b$. The loose joint between the rivet and disk 5 allows for a limited universal movement, so that the disk can accommodate itself to the contour of the tire.

In use, the punctured tire A is prepared in the usual manner, as is also the patch B, and the latter applied to the puncture. The tool is then opened by compressing the handle members 1 together so as to separate the jaw members, and the tool is then applied to the tire and patch with the disk 5 on the side of the tire opposite from the patch B, and in this position the jaws are closed by the operator releasing the pressure from the handle members 1. The spring 4 thereupon acts on the two sections of the tool to force the jaws together. The disk 5 being concaved allows for the greater thickness of the patch at the center and uniform pressure is applied to the patch at all points. In case the tire is uneven, due to imperfections or adjacent repairs, the disk 5 will accommodate itself, because of the universal joint between it and its associated jaw. After the patch has been allowed to set for a suitable length of time, the tool is opened and removed.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A self-closing tire clamp comprising a pair of relatively movable jaws, spring means for yieldingly holding the jaws in closed position, a plate on one of the jaws having a concave surface opposed to the other jaw, and a pivot loosely connecting the center of the plate with its respective jaw and capable of having a limited universal movement.

2. A self-closing tire patch clamping tool comprising two sections hingedly connected together intermediate their ends, whereby the sections present a pair of jaws at one end of the tool and a pair of handle members at the other end, a spring acting between the handle members to hold the jaws closed, and a plate pivotally connected with one of the jaws and having a limited universal movement thereon.

3. A tire patch clamping tool comprising two sections, each section having intermediate its ends a plurality of lugs, a hinge pintle passing through the lugs for hingedly connecting the sections together, a spring connected with the pintle and bearing against both sections at one end of the tool to force the other ends of the sections together to form jaws, and a concave plate on the jaw end of one section and coöperating with the jaw end of the other section.

HERMAN BRETTHAUER.

Witnesses:
WILLIAM CERMAK,
ERNEST SEDEWITZ.

Copies of this patent may be obtained for five cents each, by addressing the "Commissioner of Patents, Washington, D. C."